United States Patent
Bertani

(10) Patent No.: US 9,598,099 B2
(45) Date of Patent: Mar. 21, 2017

(54) HANDLE

(71) Applicant: ELESA S.p.A., Milan (IT)

(72) Inventor: Alberto Bertani, Monza (IT)

(73) Assignee: ELESA S.P.A., Milan (IT)

( * ) Notice: Subject to any disclaimer, the term of this patent is extended or adjusted under 35 U.S.C. 154(b) by 0 days.

(21) Appl. No.: 14/632,256

(22) Filed: Feb. 26, 2015

(65) Prior Publication Data

US 2015/0239486 A1    Aug. 27, 2015

(30) Foreign Application Priority Data

Feb. 26, 2014 (IT) .............................. MI20140074 U

(51) Int. Cl.
  *B62D 1/04*      (2006.01)
  *B25G 1/04*      (2006.01)
  *B25G 1/10*      (2006.01)

(52) U.S. Cl.
  CPC .............. *B62D 1/043* (2013.01); *B25G 1/046* (2013.01); *B25G 1/105* (2013.01); *Y10T 74/20864* (2015.01)

(58) Field of Classification Search
  CPC . Y19T 16/529; Y10T 24/1424; Y10T 70/569; Y10T 70/5757; B62D 1/043; B25G 1/046; B25G 1/105
  USPC ............. 74/557; 525/109; 524/210; 493/111; 81/475
  See application file for complete search history.

(56) References Cited

U.S. PATENT DOCUMENTS

| | | | | | |
|---|---|---|---|---|---|
| 1,784,230 | A | * | 12/1930 | Freeman | Y10T 74/20864 74/552 |
| 2,118,573 | A | * | 5/1938 | Sinko | B62D 1/043 74/557 |
| RE20,890 | E | * | 10/1938 | Thorp | B62D 1/043 74/557 |
| 2,510,349 | A | * | 6/1950 | Reisner | H01J 37/20 250/49.5 |
| 2,981,495 | A | * | 4/1961 | King | A01K 89/006 242/265 |
| 4,552,034 | A | * | 11/1985 | Bertani | G05G 1/087 403/111 |

(Continued)

FOREIGN PATENT DOCUMENTS

| | | | |
|---|---|---|---|
| CN | 2868578 Y | 2/2007 | |
| GB | 2523671 | * 9/2015 | ............ B62D 1/043 |
| JP | 62-205408 | * 10/1987 | ............ B62D 1/043 |

OTHER PUBLICATIONS

Polyamide 66 (PA66); www2.ulprospector.com; Sep. 3, 2015.*

(Continued)

*Primary Examiner* — Vinh Luong
(74) *Attorney, Agent, or Firm* — Pearne & Gordon LLP

(57) ABSTRACT

Handle consisting of a gripping knob internally provided with a housing cavity in a stable position of a pin, the pin consisting of at least a portion with a larger-diameter section and of a portion with a smaller diameter projecting therefrom. At the top end of the smaller-diameter portion, a retaining member is provided, having a larger diameter with respect to that of the smaller-diameter portion. An elastic bush is housed on the smaller-diameter portion for engagement with the inner surface of the knob. Between the retaining member and the elastic bush, a washer is arranged of a material aimed at minimizing friction.

2 Claims, 2 Drawing Sheets

(56) References Cited

U.S. PATENT DOCUMENTS

| | | | | |
|---|---|---|---|---|
| 5,150,853 A * | 9/1992 | Bernard | ............... | A01K 89/006 |
| | | | | 242/283 |
| 5,590,149 A * | 12/1996 | Reeder | ................. | G02B 7/1825 |
| | | | | 372/107 |
| 6,170,123 B1 | 1/2001 | Holland-Letz | | |
| 6,832,413 B1 | 12/2004 | Applewhite | | |
| 7,712,393 B2 * | 5/2010 | Bertani | .................... | G05G 1/04 |
| | | | | 16/429 |
| 7,722,678 B2 * | 5/2010 | Brown | ................. | A61B 17/164 |
| | | | | 606/282 |
| 2006/0016300 A1* | 1/2006 | Bubel | ................ | A61B 17/8875 |
| | | | | 81/475 |
| 2011/0196080 A1* | 8/2011 | Matsuoka | ............... | C08L 77/00 |
| | | | | 524/210 |
| 2013/0145909 A1 | 6/2013 | Rogers | | |
| 2014/0228519 A1* | 8/2014 | Nakayama | ................ | C08J 5/06 |
| | | | | 525/109 |

OTHER PUBLICATIONS

Nylon 66, wikipedia.org, Dec. 2015.*
EPO Abstract of JPS62205408 (A), Okazaki, Oct. 9, 1987.*
JPO Machine Translation of JP 62-205408, Okazaki Michio, Oct. 1987.*
Search Report issued in Polish Utility Model Application No. W-123840 dated Jun. 1, 2015.

* cited by examiner

HANDLE

FIELD OF THE INVENTION

The present utility model relates to the general sector of handles, and in particular to the handles for the transport of handling-handling members.

STATE OF THE PRIOR ART

Handles for transporting handling members, such as driving wheels, consisting of a variously shaped knob from the lower end of which a pin projects provided with engagement means, for example threadings to be brought in engagement with suitable grooves provided in the handling member (for example a threaded hole) are generically known.

Typically, to allow the correct transport, and avoid undesired inconveniences to the operator's hands, it is provided that a handle of this type is free to rotate on itself, so that the hand's grip remains substantially fixed, while a relative movement is imparted to the handle body with respect to the flywheel.

However, this type of operation, understandably implies conditions of wear of the retaining surface of the pin due to the simultaneous presence of the relative rotation between the pin and the handle, and of the axial action due to the actuation by the operator until complete wear, and resulting destruction, of the pin grip. Such aspect is taking up an ever growing importance taking into account the particularly intense and hard use in applications such as those of the compact warehouses in which such handles are used.

Laboratory tests, even though under a not excessive load, have shown that the handle according to the prior art even after few hours of use manifests the first signs of wear. Over time, wear continues until causing the coming out of the handle from the pin, cancelling the functionality of the flywheel.

The object of the present utility model is therefore to build a handle which overcomes the mentioned drawbacks and which allows an extended duration before it is affected by wear and before it leads to the detachment from the correct working site. This object is achieved through a handle consisting of a gripping knob internally provided with a housing cavity in a stable position of a pin, said pin consisting of at least a larger-diameter section portion and of a lesser-diameter portion projecting therefrom, at the summit end of said lesser-diameter portion a retaining member being provided, having a larger diameter with respect to that of said portion, on said portion an elastic bush being housed for the engagement with the inner surface of said knob, characterised in that between said retaining member and said elastic bush a washer is arranged of a material aimed at reducing friction to a minimum. The dependent claims describe preferential features of the invention.

BRIEF DESCRIPTION OF THE DRAWINGS

Further features and advantages of the invention are in any case more evident from the following detailed description of a preferred embodiment, given purely as a non-limiting example and illustrated in the attached drawings, wherein.

Figure 1:
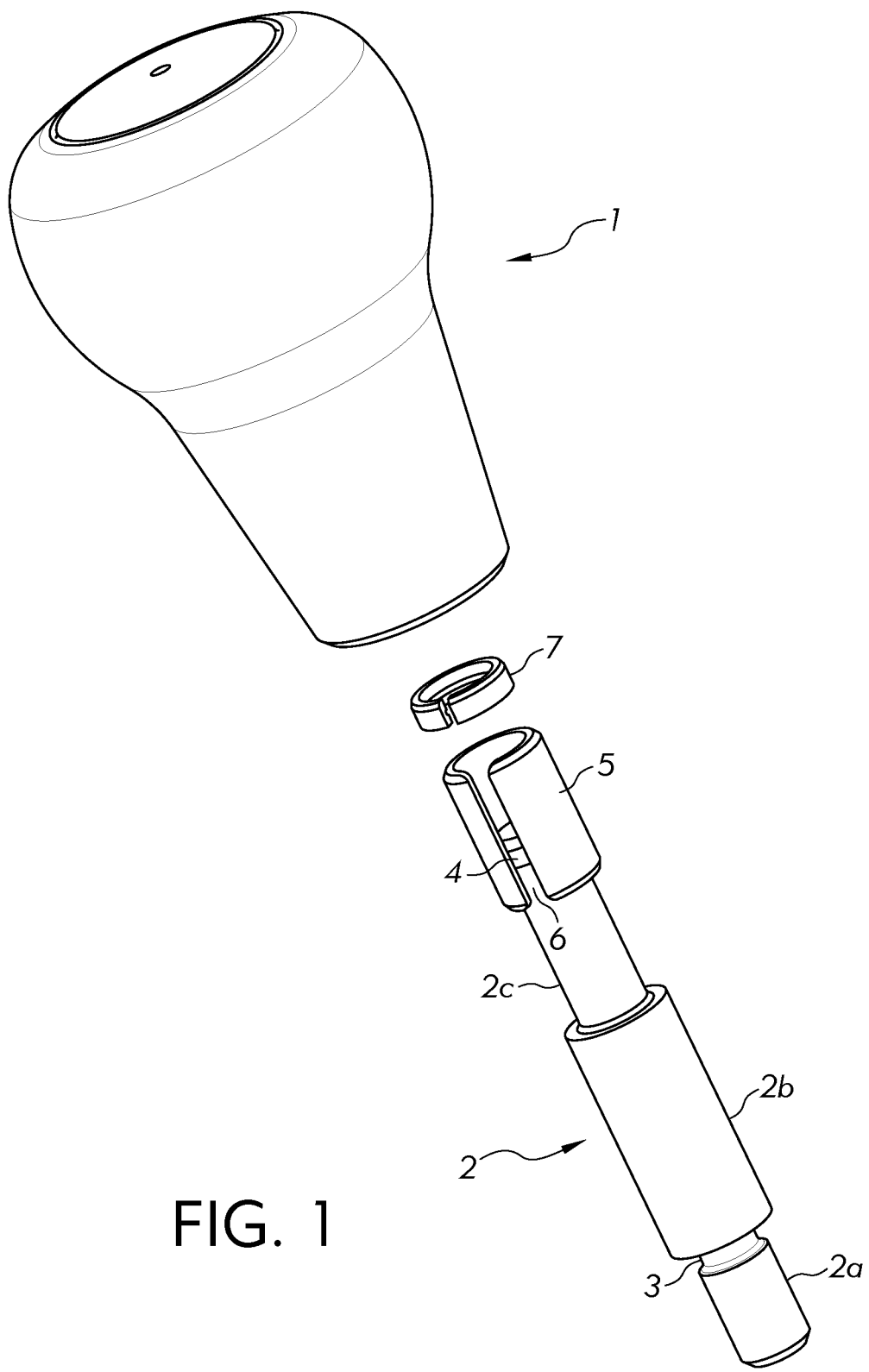
FIG. 1 shows an exploded view of the handle according to the invention.

The handle according to the model consists of a gripping knob 1 within which a pin 2 for the engagement with a transport member typically a handling flywheel, is housed and kept in a stable position.

Pin 2 is shaped so that a smaller-diameter cylindrical portion 2a and a larger-diameter cylindrical portion 2b are recognisable below, between the two portions a groove 3 being provided, apt to the engagement with a complementary engagement members on the flywheel (not shown). At the other end of said larger-diameter cylindrical portion 2b a third cylindrical portion is provided 2c—having a different diameter with respect to the other two—terminating with a head retaining member 4, having a larger diameter than that of said third cylindrical portion 2c.

An elastic bush 5 covers a good deal of the third cylindrical portion 2c, save for a thin slit 6, due to mounting requirements.

Between retaining member 4 and elastic bush 5 an anti-wear washer 7 of a material aimed at reducing friction to a minimum is arranged.

Figure 2:
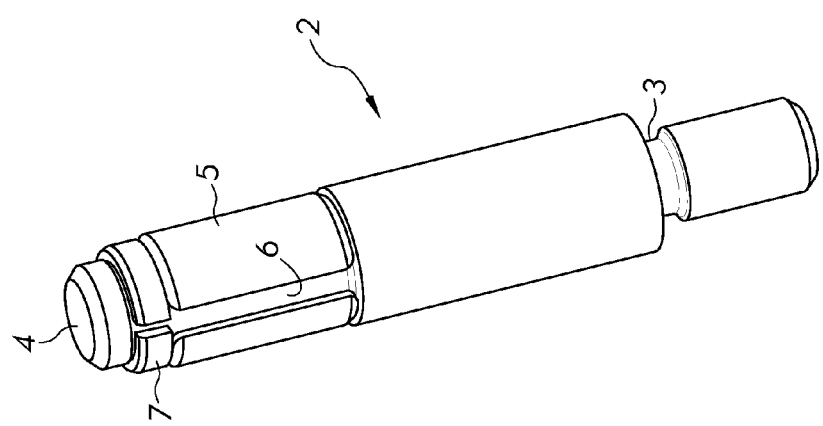
FIG. 2 is the view of the pin belonging to the handle according to the invention.

Elastic bush 5 and washer 7 thus engage with pin 2, so as to make up an assembly clearly illustrated in FIG. 2, apt to the engagement with knob 1.

Figure 3:
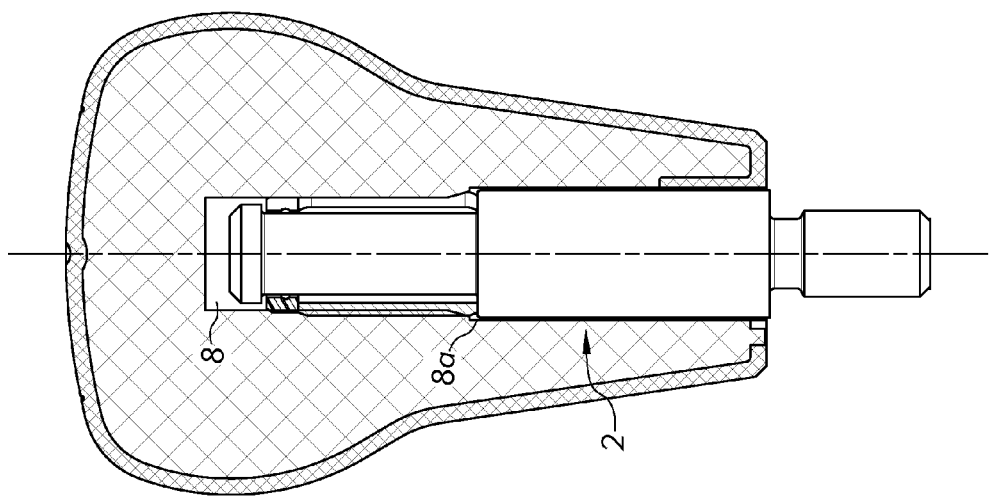
FIG. 3 shows the section view of the embodiment of the invention according to FIG. 1.

As can be observed in FIG. 3, the handle provides internally a cavity 8 with a substantially cylindrical base for the housing of the assembly just described consisting of pin 2, of bush 5 and of washer 7. In the light of the special shape of pin 2 and of elastic bush 5, an annular choking 8a is provided apt to guarantee the integral engagement of the inner wall of knob 1 with elastic bush 5.

In other words, pin 2, equipped with elastic bush 5 and with washer 7, as illustrated in FIG. 2, is inserted in knob 1, so that elastic bush 5 is in forced engagement with said knob 1 to make up an integral structure.

Preferably, for the handle to obtain optimal performances in terms of war resistance, the washer consists of suitably additioned polyamidic resins. Even more preferably, the washer consists of polyimide 6/6 loaded with PTFE and aramidic fibres.

During operation, the operator imparts to the handle such a force as to imply—within the handle—contact between retaining surface 4 and the top of the elastic bush and the concomitant revolution of knob 1 with respect to pin 2. During the rotation, the contact between elastic bush 5 and retaining surface 4 occurs through washer 7, and therefore without special frictions, leaving fully free from wear the retaining surface 4 of pin 2.

In order to assess the validity of the adopted solution, the handle just described has undergone various resistance tests applying a constant axial force thereto. It has thus been possible to prove that the handle is maintained cohesive, without the pin risking to come off, and with no significant wear of the washer, for over 10,000 work hours.

From the preceding description, it is proved that a handle has been obtained which accomplishes the object of the present application. As a matter of fact, it is fully devoid of problems related to the wear of the articulation, and of the resulting risk of coming off of the pin member therefrom. As a result, a remarkable improvement has been obtained in the duration of the device.

However, it is understood that the protection of the utility model described above must not be considered limited to the special embodiment illustrated, but extends to any other technically equivalent construction variant which has not been defined here.

The invention claimed is:

1. A handle consisting of:
   a gripping knob internally provided with a cavity for housing a pin, said pin consisting of at least a larger-diameter cylindrical portion and of a smaller-diameter cylindrical portion projecting therefrom at one end, and of a third cylindrical portion projecting from an opposite end of said larger-diameter cylindrical portion, and of a head retaining member disposed at a top end of said third cylindrical portion and having a larger diameter than that of said third cylindrical portion;
   an elastic bush, comprising a cylindrical "C"-shaped geometry defined by a slit extending along a longitudinal axis of the bush, that is snap-fit and rotationally housed on said third cylindrical portion, wherein insertion of the pin and elastic bush into the cavity of the gripping knob causes the elastic bush to be in forced, integral engagement with an inner surface of said knob at an annular choking of the cavity to thereby make an integral structure that enables relative rotation between the integral structure of the gripping knob and elastic bush, and the third cylindrical portion; and
   a washer rotationally housed on said third cylindrical portion and interposed between said head retaining member and said elastic bush, whereby contact between said elastic bush and said head retaining member occurs through the washer,
   wherein the washer consists of polyamidic resins that minimize rotational friction between said head retaining member and said elastic bush.

2. The handle of claim 1, wherein said polyamidic resins consist of polyamide 6/6 loaded with PTFE and aramidic fibers.

* * * * *